(12) United States Patent
Woo et al.

(10) Patent No.: US 11,489,371 B2
(45) Date of Patent: Nov. 1, 2022

(54) WIRELESS CHARGING DEVICE COMMUNICATING WITH ELECTRONIC DEVICE AND COMMUNICATION METHOD OF WIRELESS CHARGING DEVICE

(71) Applicant: Samsung Electronics Co., Ltd., Suwon-si (KR)

(72) Inventors: Taehyun Woo, Suwon-si (KR); Yongsik Nam, Suwon-si (KR); Youngjoon Park, Suwon-si (KR); Jungsu Park, Suwon-si (KR); Woojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 16/934,511

(22) Filed: Jul. 21, 2020

(65) Prior Publication Data
US 2021/0036558 A1 Feb. 4, 2021

(30) Foreign Application Priority Data
Aug. 2, 2019 (KR) .................. 10-2019-0094353

(51) Int. Cl.
*H02J 50/80* (2016.01)
*H02J 50/10* (2016.01)

(52) U.S. Cl.
CPC .............. *H02J 50/80* (2016.02); *H02J 50/10* (2016.02)

(58) Field of Classification Search
CPC .................................. H02J 50/80; H02J 50/10
USPC ......................................................... 307/104
See application file for complete search history.

(56) References Cited

U.S. PATENT DOCUMENTS

| 9,806,557 | B2 | 10/2017 | Gao et al. |
| 10,763,699 | B2* | 9/2020 | Dibben ................... H02J 50/40 |
| 2014/0312852 | A1* | 10/2014 | Won ........................ H02J 50/80 |
| | | | 320/137 |
| 2015/0278038 | A1* | 10/2015 | Halker .................. B60L 53/126 |
| | | | 714/3 |
| 2017/0018955 | A1* | 1/2017 | Lee ....................... H04B 5/0037 |
| 2017/0070104 | A1* | 3/2017 | Chung .................... H02J 50/40 |
| 2018/0159371 | A1* | 6/2018 | Kim .................... H02J 7/00034 |
| 2019/0372403 | A1* | 12/2019 | Park ........................ H02J 50/10 |

* cited by examiner

*Primary Examiner* — Alfonso Perez Borroto
(74) *Attorney, Agent, or Firm* — Jefferson IP Law, LLP

(57) ABSTRACT

A wireless charging device in communication with an electronic device is provided. The wireless charging device includes a charging circuit configured to communicate with the electronic device at a first frequency that is included in a frequency band of the electronic device and supple power received from an external power source to the electronic device depending on a communication result at the first frequency, and a control circuit configured to convert the first frequency, based on a response of the electronic device to a first connection signal that is transmitted from the charging circuit to the electronic device.

2 Claims, 9 Drawing Sheets

WIRELESS CHARGING DEVICE COMMUNICATING WITH ELECTRONIC DEVICE AND COMMUNICATION METHOD OF WIRELESS CHARGING DEVICE

CROSS-REFERENCE TO RELATED APPLICATION(S)

This application is based on and claims priority under 35 U.S.C. § 119(a) of a Korean patent application number 10-2019-0094353, filed on Aug. 2, 2019, in the Korean Intellectual Property Office, the disclosure of which is incorporated by reference herein in its entirety.

BACKGROUND

1. Field

The disclosure relates to a wireless charging device in communication with an electronic device and a communication method of the wireless charging device.

2. Description of Related Art

A wireless charging device may wirelessly charge a battery of an electronic device (e.g., a smart phone) while connected to an external power source (e.g., a power adapter). For example, the wireless charging device may communicate with the electronic device within a specified frequency band to wirelessly charge the battery of the electronic device.

The above information is presented as background information only to assist with an understanding of the disclosure. No determination has been made, and no assertion is made, as to whether any of the above might be applicable as prior art with regard to the disclosure.

SUMMARY

A wireless charging device may transmit a signal (e.g., a ping) including information to an electronic device and may be wirelessly connected to the electronic device depending on a result of the transmission. In addition, the wireless charging device may consume a current to transmit the signal to the electronic device. In this case, in an external power source that supplies power to the wireless charging device, a voltage may be increased by converting a frequency to compensate for a current consumption due to the transmission of the signal.

However, when the frequency of the external power source is converted, in the wireless charging device, frequencies for communicating with the electronic device may be interfered due to the converted frequency. For example, when the wireless charging device communicates with the electronic device at the same frequency as the external power source, the wireless charging device may not receive a response (e.g., a packet) to the signal from the electronic device or may receive a response including an error.

Therefore, because communication with the electronic device is not smooth depending on the frequency of the external power source, the wireless charging device has problems that delay a connection with the electronic device or overcharge the battery of the electronic device.

Aspect of the disclosure are to address at least the above-mentioned problems and/or disadvantages and to provide at least the advantages described below. Accordingly, an aspect of the disclosure is to provide a wireless charging device and a method of communication of the wireless charging device to communicate with an electronic device without interfering with a frequency of an external power source.

Additional aspects will be set forth in part in the description which follows and, in part, will be apparent from the description, or may be learned by practice of the presented embodiments.

In accordance with an aspect of the disclosure, a wireless charging device in communication with an electronic device is provided. The wireless charging device includes a charging circuit configured to communicate with the electronic device at a first frequency that is included in a frequency band of the electronic device and supply power received from an external power source to the electronic device depending on a communication result at the first frequency, and a control circuit configured to convert the first frequency, based on a response of the electronic device to a first connection signal that is transmitted from the charging circuit to the electronic device.

In accordance with another aspect of the disclosure, a method of communicating of a wireless charging device to communicate with an electronic device is provided. The method includes transmitting, by a charging circuit, a first connection signal to the electronic device at a first frequency that is included in a frequency band of the electronic device, supplying, by the charging circuit, power received from an external power source to the electronic device, based on a communication result at the first frequency, and converting, by a control circuit, the first frequency, based on a response of the electronic device to the first connection signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
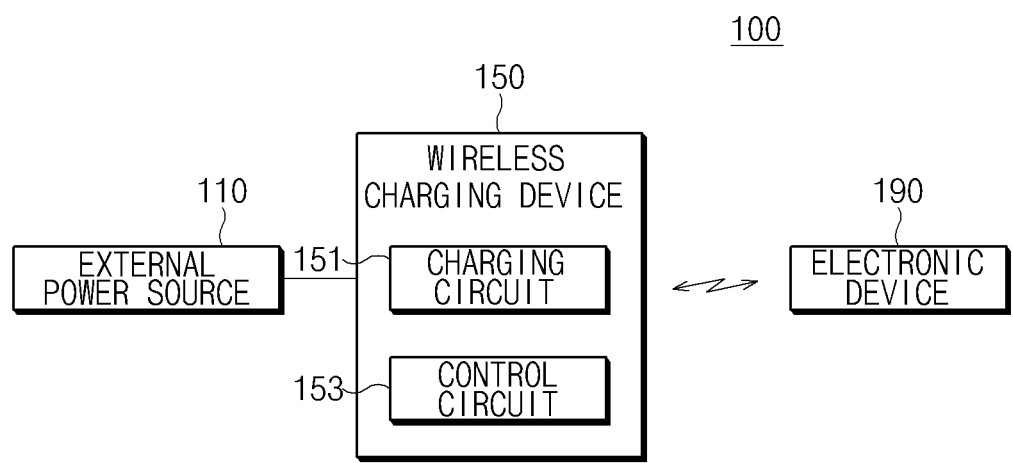
FIG. 1 is a block diagram illustrating a power transmission and a power reception of a wireless charging device according to an embodiment of the disclosure.

FIG. 1 is a block diagram illustrating a power transmission and a power reception of a wireless charging device according to an embodiment of the disclosure.

Referring to FIG. 1, a wireless charging device 150 according to an embodiment may transmit and receive power between an external power source 110 and an electronic device 190. In this case, the wireless charging device 150 may form a power transmission/reception relationship 100 with the external power source 110 and the electronic device 190.

According to one embodiment, the external power source 110 may supply the power to the wireless charging device 150. For example, the external power source 110 may supply the power to the wireless charging device 150 depending on a current consumption (e.g., ping transmission or charging of the electronic device 190) of the wireless charging device 150. The external power source 110 may increase a voltage by converting a power frequency (e.g., a frequency for supplying the power). In this case, the external power source 110 may have a state of supplying a greater amount of power to the wireless charging device 150 than other state (e.g., the state in which the wireless charging device 150 does not consume a current).

According to various embodiments, the external power source 110 may be connected to the wireless charging device 150 by wiredly or wirelessly. For example, the external power source 110 may be a power adapter.

According to an embodiment, the wireless charging device 150 may communicate with the electronic device 190 in a state of being connected with the external power source 110. In addition, the wireless charging device 150 may supply the power to the electronic device 190 while being connected to the external power source 110. The wireless charging device 150 may include a charging circuit 151 and a control circuit 153.

According to one embodiment, the charging circuit 151 may communicate with the electronic device 190 at a frequency, which is included within a frequency band of the electronic device 190, of a frequency band of the wireless charging device 150. For example, the charging circuit 151 may communicate with the electronic device 190 at a first frequency and/or a second frequency.

According to an embodiment, the charging circuit 151 may communicate with the electronic device 190 at the first frequency that is included in the frequency band of the electronic device 190. In this case, the charging circuit 151 may transmit a first connection signal (e.g., the ping for identifying a connection of the electronic device 190) to the electronic device 190 and may supply the power to the electronic device 190, based on a result of the transmission. For an example, the charging circuit 151 may transmit the first connection signal to the electronic device 190, and as a result, may receive first error information (e.g., a packet including noise) from the electronic device 190. In this case, the charging circuit 151 may have a state in which a communication channel cannot be formed with the electronic device 190. For another example, the charging circuit 151 may transmit the first connection signal to the electronic device 190, and as a result, may receive first connection information (e.g., a packet for establishing a communication channel) from the electronic device 190. In this case, the charging circuit 151 may form the communication channel with the electronic device 190, thereby supplying the power of the external power source 110 to the electronic device 190.

According to various embodiments, when the charging circuit 151 transmits the first connection signal to the electronic device 190, the charging circuit 151 may consume a current. In this case, a magnitude of the current that is consumed in the charging circuit 151 may be a magnitude of the current to which the power frequency of the external power source 110 may be converted.

According to various embodiments, the charging circuit 151 may transmit the first connection signal to the electronic device 190 at a specified period to form the communication channel with the electronic device 190.

According to an embodiment, the charging circuit 151 may communicate with the electronic device 190 at the second frequency that is included in the frequency band of the electronic device 190. In this case, the charging circuit 151 may transmit a second connection signal (e.g., the ping for identifying a charging state of the electronic device 190) to the electronic device 190 and may supply the power to the electronic device 190 depending on a result of the transmission. For example, the charging circuit 151 may transmit the second connection signal to the electronic device 190, and as a result, may receive second error information (e.g., a packet including noise) from the electronic device 190. In this case, the charging circuit 151 may not be in communication with the electronic device 190. For another example, the charging circuit 151 may transmit the second connection signal to the electronic device 190, and as a result, may receive second connection information (e.g., a packet for notifying the charging state) from the electronic device 190. In this case, the charging circuit 151 may identify the charging state of the electronic device 190, thereby supplying the power received from the external power source 110 to the electronic device 190 under a set condition (e.g., an auxiliary charging condition). According to an embodiment, the auxiliary charging condition may mean a condition in which a charging state of the battery of the electronic device 190 is not a full charging state. For example, the auxiliary charging condition may correspond to a condition in which a charge level charged in the battery of the electronic device 190 is smaller than a predetermined charge level corresponding to a fully charged state of the battery. According to an embodiment, an auxiliary charging may mean supplying power to the battery of the electronic device 190 that is not in the fully charged state of the battery. In this case, the charging level of the battery of the electronic device 190 performed the auxiliary charging may be higher than before the auxiliary charging is performed.

According to an embodiment, the charging circuit 151 may communicate with the electronic device 190 at the second frequency that is included in the frequency band of the electronic device 190. In this case, the charging circuit 151 may transmit the second connection signal (e.g., the ping for checking the charging state of the electronic device 190) to the electronic device 190 and may supply the power to the electronic device 190 depending on a result of the transmission. For an example, the charging circuit 151 may transmit the second connection signal to the electronic device 190 every first period that is specified, and as a result, the charging circuit 151 may receive the second connection information (e.g., the packet for notifying the charging state) from the electronic device 190 in a second period (e.g., a period of repeating the first period six times in succession) after the first period. In this case, the charging circuit 151 may identify the charging state of the electronic device 190, thereby supplying the power received from the external power source 110 to the electronic device 190 under the set condition (e.g., the auxiliary charging condition). According to an embodiment, the auxiliary charging condition may refer, for example, to a condition in which a charging state of the battery of the electronic device 190 is not a full charging state. For example, the auxiliary charging condition may correspond to a condition in which a charge level charged in the battery of the electronic device 190 is smaller than a predetermined charge level corresponding to a fully charged state of the battery. For another example, the charging circuit 151 may transmit the second connection signal to the electronic device 190 every first period that is specified, and as a result, the charging circuit 151 may not receive the second connection information (e.g., the packet for notifying the charging state) from the electronic device 190 in a third period (e.g., a period of repeating the first period eight times in succession) after the first period. In this case, the power supplied from the external power source 110 may be cut off. In this case, the charging circuit 151 may cut off the power, based that the power of the wireless charging device 150 is switched from ON state to OFF state.

According to various embodiments, when the charging circuit 151 transmits the second connection signal to the electronic device 190, the charging circuit 151 may consume the current. In this case, a magnitude of the current that is consumed in the charging circuit 151 may be a magnitude of the current to which the power frequency of the external power source 110 may be converted.

According to various embodiments, the charging circuit 151 may receive the first connection information (e.g., the packet for establishing the communication channel) to the first connection signal (e.g., the ping for identifying the connection of the electronic device 190), and then the charging circuit 151 may transmit the second connection signal (e.g., the ping for identifying the charging state of the electronic device 190) to the electronic device 190 while the charging circuit 151 establishes the communication channel with the electronic device 190. In this case, the charging circuit 151 may be in a state (e.g., a power hold mode (PHM)) in which the power is not supplied to the electronic device 190.

According to an embodiment, the control circuit 153 may convert a frequency (e.g., the first frequency and/or the second frequency) for communication between the charging circuit 151 and the electronic device 190. For example, the control circuit 153 may convert the first frequency and/or the second frequency into a frequency that is included in the frequency band of the electronic device 190.

According to an embodiment, the control circuit 153 may convert the first frequency, based on a response of the electronic device 190 to the first connection signal (e.g., the ping for identifying the connection of the electronic device 190) that is transmitted from the charging circuit 151 to the electronic device 190. For example, when the first error information (e.g., the packet including noise) to the first connection signal is received from the electronic device 190 to the charging circuit 151, the control circuit 153 may convert the first frequency into another frequency that is included in the frequency band of the electronic device 190. In this case, the control circuit 153 may allow the charging circuit 151 to communicate with the electronic device 190 at the converted first frequency.

According to an embodiment, the control circuit 153 may convert the second frequency, based on a response of the electronic device 190 the second connection signal (e.g., the ping for identifying the charging state of the electronic device 190) that is transmitted from the charging circuit 151 to the electronic device 190. For example, when the second error information (e.g., the packet including noise) to the second connection signal is received from the electronic device 190 to the charging circuit 151, the control circuit 153 may convert the second frequency into another frequency that is included in the frequency band of the electronic device 190. In this case, the control circuit 153 may allow the charging circuit 151 to communicate with the electronic device 190 at the converted second frequency.

According to various embodiments, the control circuit 153 may convert the first frequency and the second frequency into different frequencies. For example, because different magnitudes of current may be consumed depending on the first connection signal (e.g., the ping for identifying the connection of the electronic device 190) and the second connection signal (e.g., the ping for identifying the charging state of the electronic device 190), the control circuit 153 may always convert the first frequency and the second frequency differently. In this case, the power frequency (e.g., the frequency for supplying the power) of the external power source 110 may also be converted differently, based on the first connection signal and the second connection signal.

According to an embodiment, the control circuit 153 may allow the charging circuit 151 to supply the power under the set condition, based on a time at which the second connection information (e.g., the packet for notifying the charging state) is received from the electronic device 190. For example, the control circuit 153 may set a period (e.g., the first period, the second period, and/or the third period) to the time at which the second connection information is received.

According to an embodiment, the control circuit 153 may designate the first period. For example, the control circuit 153 may designate the first period in which the charging circuit 151 transmits the second connection signal (e.g., the ping for identifying the charging state of the electronic device 190) to the electronic device 190 every first period (e.g., 170 ms) that is designated. When the second connection information (e.g., the packet for notifying the charging state) is received from the electronic device 190 in the first period as a response to the second connection signal of the charging circuit 151, the control circuit 153 may control to maintain a state in which the power of the electronic device 190 is not supplied.

According to an embodiment, the control circuit 153 may designate the second period. For example, the control circuit 153 may designate the second period (e.g., a period in which the first period is repeated six times in succession) in which the charging circuit 151 receives the second connection information (e.g., the packet for notifying the charging state) after the first period (e.g., 170 ms). When the second connection information is received from the electronic device 190 in the second period as a response to the second connection signal (e.g., the ping for identifying the charging state of the electronic device 190) of the charging circuit 151, the control circuit 153 may allow the power of the electronic device 190 to be supplied under the auxiliary charging condition. According to an embodiment, the auxiliary charging condition may refer, for example, to a condition in which a charging state of the battery of the electronic device 190 is not a full charging state. For example, the auxiliary charging condition may correspond to a condition in which a charge level charged in the battery of the electronic device 190 is smaller than a predetermined charge level corresponding to a fully charged state of the battery. The second period may be, for example, a period in which the second connection information is received after a plurality of consecutive first periods.

According to an embodiment, the control circuit 153 may designate the third period. For example, the control circuit 153 may designate the third period (e.g., a period in which the first period is repeated eight times in succession) in which the charging circuit 151 does not receive the second connection information (e.g., the packet for notifying the charging state) after the first period (e.g., 170 ms). When the second connection information of the electronic device 190 is not received in the third period as a response to the second connection signal (e.g., the ping for identifying the charging state of the electronic device 190) of the charging circuit 151, the control circuit 153 may allow the power supplied to the electronic device 190 to be cut off. The third period may be, for example, a period in which the second connection information is not received after the plurality of consecutive first periods. In this case, the third period may be a time after the second period.

According to various embodiments, the control circuit 153 may designate a period (e.g., the first period) in which the charging circuit 151 receives the first connection information (e.g., the packet for establishing the communication channel). For example, the control circuit 153 may cause the charging circuit 151 to transmit the first connection signal (e.g., the ping for identifying the connection of the electronic device 190) to the electronic device 190 every first period. In this case, the first period in which the first connection signal is transmitted may be the same as the first period in which the second connection signal is transmitted.

According to various embodiments, the wireless charging device 150 may be replaced with the electronic device 190. In this case, two electronic devices may be provided, and one electronic device 190 may replace an operation of the wireless charging device 150.

According to an embodiment, the electronic device 190 may communicate with the electronic device 190. For example, the electronic device 190 may receive the power from the wireless charging device 150 by communicating with the wireless charging device 150 at the frequency that is included in the frequency band of the electronic device 190.

According to an embodiment, the electronic device 190 may transmit connection information (e.g., the first connection information or the second connection information) to the wireless charging device 150 at the specified frequency band depending on a state connected to the wireless charging device 150 or a charging state of the electronic device 190. For example, when the electronic device 190 does not form a communication channel with the wireless charging device 150, the electronic device 190 may transmit first connection information (e.g., the packet for establishing the communication channel) in response to first connection signal (e.g., the ping for identifying the connection of the electronic device 190) of the wireless charging device 150. In this case, the electronic device 190 may communicate with the wireless charging device 150 at the first frequency. For another example, when the electronic device 190 establishes the communication channel with the wireless charging device 150, the electronic device 190 may transmit second connection information (e.g., the packet for notifying the charging state) in response to the second connection signal (e.g., the ping for identifying the charging state of the electronic device 190) of the wireless charging device 150. In this case, the electronic device 190 may communicate with the wireless charging device 150 at the second frequency.

According to various embodiments, the electronic device 190 may be at least one of a wearable device, a smartphone, and a tablet PC, which are capable of charging power by communicating with the wireless charging device 150. For example, the electronic device 190 may include a communication module, a battery, and a wireless charging coil (e.g., a receiving coil).

Figure 2:
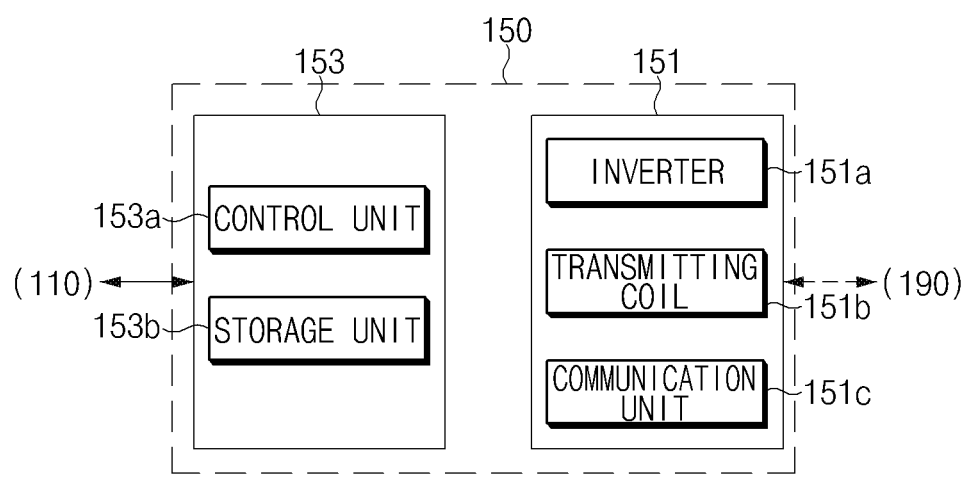
FIG. 2 is a block diagram illustrating a wireless charging device according to an embodiment of the disclosure.

FIG. 2 is a block diagram illustrating a wireless charging device according to an embodiment of the disclosure.

Referring to FIG. 2, in the wireless charging device 150 (e.g., the wireless charging device 150 of FIG. 1) according to an embodiment, the charging circuit 151 and the control circuit 153 may be operationally (or electrically) connected with each other. For example, the charging circuit 151 and the control circuit 153 may include components, respectively.

According to one embodiment, the charging circuit 151 may include an inverter 151a, a transmitting coil 151b, and a communication unit 151c.

According to an embodiment, the inverter 151a may convert a type of power supplied from the external power source 110. For example, when a DC power is supplied from the external power source 110, the inverter 151a may convert the DC power into an AC power. For example, the inverter 151a may cause electromagnetic induction to occur between the charging circuit 151 and the electronic device 190 depending on an AC current.

According to an embodiment, the transmitting coil 151b may form a magnetic field between the wireless charging device 150 and the electronic device 190, and may allow power to be supplied to the electronic device 190. For example, the transmitting coil 151b may form the magnetic field between the wireless charging device 150 and the electronic device 190 with the AC power converted by the inverter 151a. In this case, an induced current is generated in the electronic device 190, and the power may be supplied to the electronic device 190.

According to an embodiment, the communication unit 151c may communicate with the electronic device 190 in a state of being connected with the external power source 110. For example, the communication unit 151c may communicate with the electronic device 190 at a frequency (e.g., the first frequency and/or the second frequency) that is included in the frequency band of the electronic device 190 of frequency bands of the wireless charging device 150.

According to an embodiment, the communication unit 151c may allow a frequency (e.g., the first frequency and/or the second frequency) for communicating with the electronic device 190 to be converted. For example, when error information is received from the electronic device 190 depending on a communication between the communication unit 151c and the electronic device 190, the first frequency and/or the second frequency may be converted into a frequency that is included in the frequency band of the electronic device 190.

According to various embodiments, the communication unit 151c may include a sensor module. For example, the communication unit 151c senses an approach of the electronic device 190, and the communication unit 151c may transmit or receive signals and/or connection information with the electronic device 190 depending on a connection state with the electronic device 190 or a charging state of the electronic device 190.

According to an embodiment, the control circuit 153 may include a control unit 153a and a storage unit 153b.

According to an embodiment, the control unit 153a may allow the communication unit 151c to convert a frequency (e.g., the first frequency and/or the second frequency) for communicating with the electronic device 190. For example, when error information is received from the electronic device 190 to the communication unit 151c, the control unit 153a may allow the first frequency and/or the second frequency to be converted into a frequency that is included in the frequency band of the electronic device 190.

According to an embodiment, to supply the power to the electronic device 190 under the set condition, based on the time when the communication unit 151c receives the connection information (e.g., the packet for notifying the charging state) from the electronic device 190, the control unit 153a may designate a period (e.g., the first period, the second period, and/or the third period) to a time at which the connection information is received.

According to various embodiments, the control unit 153a may be implemented with a micro controller unit (MCU). For example, the control unit 153a may operate depending on instructions stored in the storage unit 153b.

According to an embodiment, the storage unit 153b may store information (e.g., the first connection information and/or the second connection information) for communicating with the electronic device 190 and/or may store instructions for causing the control unit 153a to operate.

According to various embodiments, the storage unit 153b may be a memory (e.g., a static random-access memory (SRAM), a flash memory) capable of storing information and/or instructions. For example, the storage unit 153b may be operationally connected to the control unit 153a, and may provide the information and/or instructions to the control unit 153a.

Figure 3:
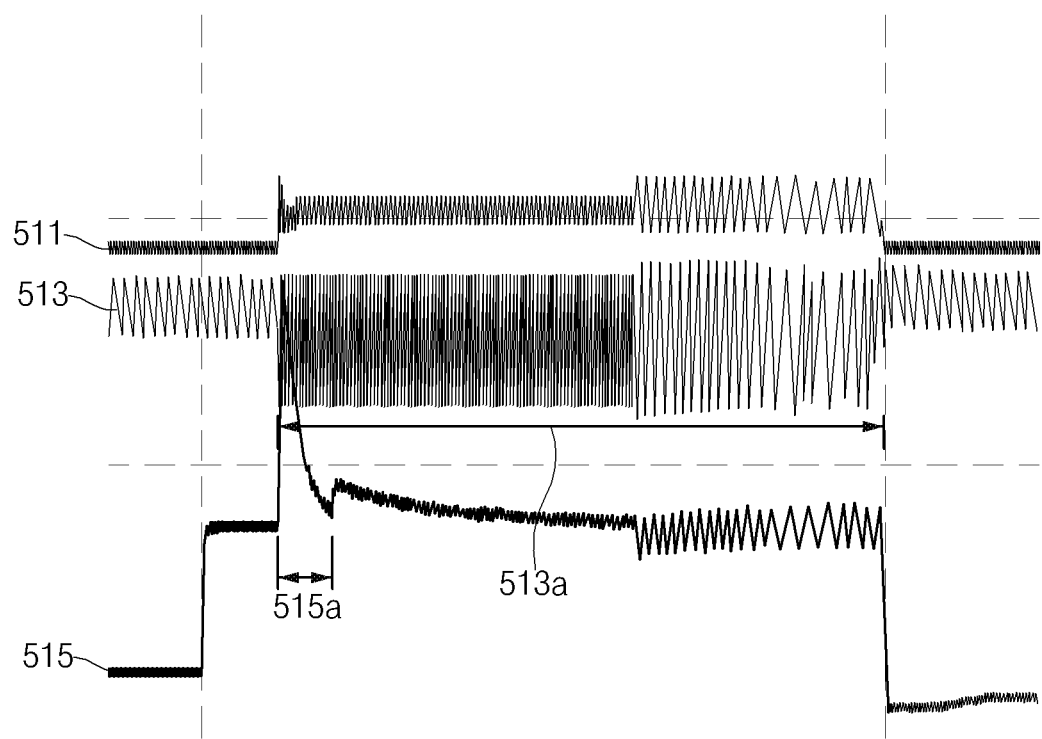
FIG. 3 is a diagram illustrating reception of connection information in a wireless charging device according to an embodiment of the disclosure.

FIG. 3 is a diagram 510 illustrating reception of connection information in a wireless charging device according to an embodiment of the disclosure.

Referring to FIG. 3, a wireless charging device (e.g., the wireless charging device 150 of FIG. 1) according to an embodiment may increase a sensing voltage 515 depending on a current consumption. For example, when the wireless charging device 150 transmits a signal (the first connection signal and/or the second connection signal) to an electronic device (e.g., the electronic device 190 of FIG. 1), a current is consumed and a voltage may increase simultaneously. For example, the wireless charging device 150 may transmit the signal to the electronic device 190 in a first communication section 515a and may receive connection information depending on the transmission of the signal.

According to an embodiment, in an external power source (e.g., the external power source 110 of FIG. 1), a driving current 511 and a driving voltage 513 may be changed in the first communication section 515a. For example, when the signal is transmitted from the wireless charging device 150 to the electronic device 190, a power frequency (e.g., a frequency for supplying power) of the external power source 110 may be stably converted in response to a consumption current that is consumed in the transmitted signal. For example, a voltage of the external power source 110 is changed to the same amplitude as that of a first variable section 513a, and a frequency may also not affect the first communication section 515a.

Figure 4:
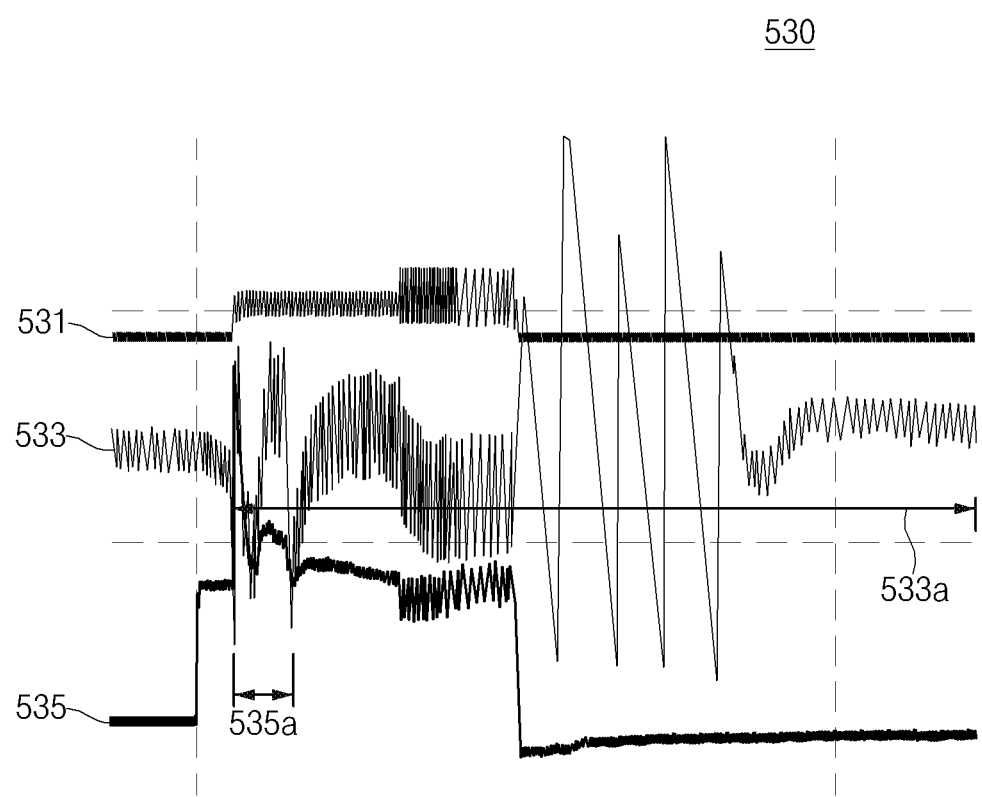
FIG. 4 is a diagram illustrating reception of error information in a wireless charging device according to an embodiment of the disclosure.

FIG. 4 is a diagram 530 illustrating reception of error information in a wireless charging device according to an embodiment of the disclosure.

Referring to FIG. 4, in a wireless charging device (e.g., the wireless charging device 150 of FIG. 1) according to an embodiment, a sensing voltage 535 may increase depending on a current consumption. For example, when the wireless charging device 150 transmits a signal (the first connection signal and/or the second connection signal) to an electronic device (e.g., the electronic device 190 of FIG. 1), a current is consumed and a voltage may increase simultaneously. For example, the wireless charging device 150 may transmit the signal to the electronic device 190 in a second communication section 535a, and may receive error information depending on the transmission of the signal.

According to various embodiments, after the second communication section 535a, the wireless charging device 150 may convert a frequency (e.g., the first frequency and/or the second frequency) of the wireless charging device 150 into another frequency that is included in the frequency band of the electronic device 190.

According to an embodiment, in an external power source (e.g., the external power source 110 of FIG. 1), a driving current 531 and a driving voltage 533 may be changed in the second communication section 535a. For example, when a signal is transmitted from the wireless charging device 150 to the electronic device 190, a power frequency of the external power source 110 (e.g., a frequency for supplying power) may be unstably converted in response to a consumption current that is consumed in the transmitted signal. For example, a voltage of the external power source 110 may be changed to the same amplitude as that of the second variable section 533a, and a frequency may also affect the second communication section 535a. In this case, an amplitude of the driving voltage 533 of the second variable section 533a may be changed to be greater than an amplitude of the driving voltage 513 of a first variable section (e.g., the first variable section 513a of FIG. 3).

Figure 5:
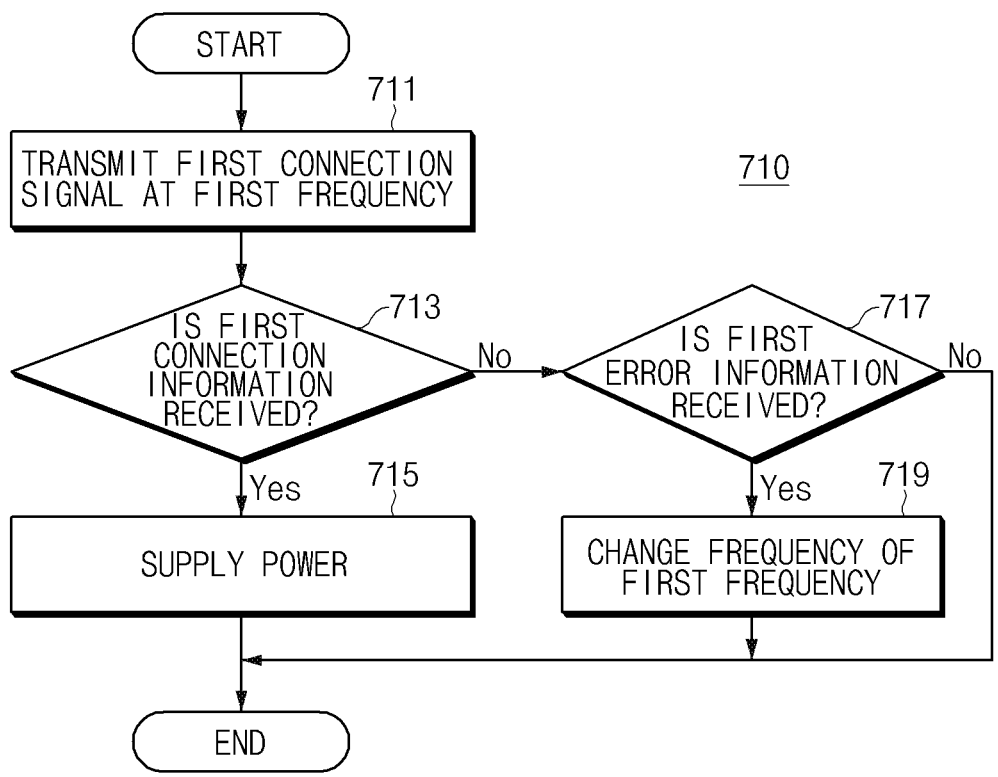
FIG. 5 is a flowchart illustrating a communication method between a wireless charging device and an electronic device, according to an embodiment of the disclosure.

FIG. 5 is a flowchart 710 illustrating a communication method between a wireless charging device and an electronic device, according to an embodiment of the disclosure.

Referring to FIG. 5, a wireless charging device (e.g., the wireless charging device 150 of FIG. 1) according to an embodiment may execute an operation based on receiving first connection information or receiving first error information, by communicating with an electronic device (e.g., the electronic device 190 of FIG. 1) at a first frequency.

Referring to operation 711, a charging circuit (e.g., the charging circuit 151 of FIG. 1) according to an embodiment may transmit a first connection signal (e.g., the ping for identifying the connection of the electronic device 190) to the electronic device 190 at a first frequency that is included in a frequency band of the electronic device 190. For example, when the first connection signal is transmitted from the charging circuit 151, a power frequency (e.g., a frequency for supplying power) of an external power source (e.g., the external power source 110 of FIG. 1) may be converted.

Referring to operation 713, the charging circuit 151 according to an embodiment may determine whether first connection information (e.g., a packet for establishing a communication channel) is received from the electronic device 190. For example, when the first connection information is received from the electronic device 190, the charging circuit 151 may execute operation 715. When the first connection information is not received from the electronic device 190, the charging circuit 151 may execute operation 717.

Referring to operation 715, the charging circuit 151 according to an embodiment may supply power to the electronic device 190 depending on the reception of the first connection information. In this case, in the external power source 110, the power frequency may not affect the first frequency. In this case, the charging circuit 151 may be in a state of initially establishing the communication channel with the electronic device 190.

Referring to operation 717, the charging circuit 151 according to an embodiment may determine whether first error information (e.g., a packet including noise) is received from the electronic device 190. For example, when the first error information is received from the electronic device 190, the charging circuit 151 may execute operation 719. When the first error information is not received from the electronic device 190, the charging circuit 151 may end an operation.

Referring to operation 719, based on the reception of the first error information in the charging circuit 151 according to an embodiment, the first frequency may be changed. In this case, the control circuit 153 may convert the first frequency into another frequency that is included in the frequency band of the electronic device 190. Therefore, the charging circuit 151 may communicate with the electronic device 190 at the converted first frequency.

Figure 6:
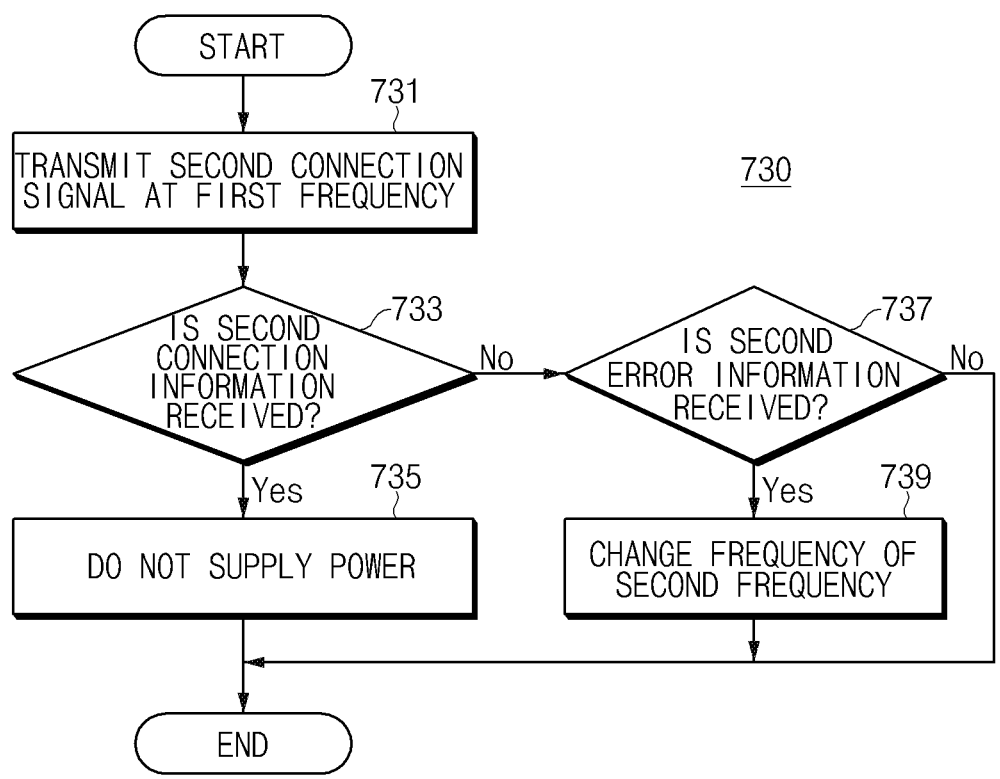
FIG. 6 is a flowchart illustrating a communication method between a wireless charging device and an electronic device, according to an embodiment of the disclosure.

FIG. 6 is a flowchart 730 illustrating a communication method between a wireless charging device and an electronic device, according to an embodiment of the disclosure.

Referring to FIG. 6, a wireless charging device (e.g., the wireless charging device 150 of FIG. 1) according to an embodiment may execute an operation based on receiving second connection information or receiving second error information, by communicating with an electronic device (e.g., the electronic device 190 of FIG. 1) at a second frequency.

Referring to operation 731, a charging circuit (e.g., the charging circuit 151 of FIG. 1) according to an embodiment may transmit a second connection signal (e.g., the ping for identifying the charging state of the electronic device 190) to the electronic device 190 at a second frequency that is included in a frequency band of the electronic device 190. For example, when the second connection signal is transmitted from the charging circuit 151, a power frequency (e.g., a frequency for supplying power) may be converted from an external power source (e.g., the external power source 110 of FIG. 1).

Referring to operation 733, the charging circuit 151 according to an embodiment may determine whether second connection information (e.g., a packet for notifying the charging state) is received from the electronic device 190. For example, when the second connection information is received from the electronic device 190, the charging circuit 151 may execute operation 735. When the second connection information is not received from the electronic device 190, the charging circuit 151 may execute operation 737.

Referring to operation 735, the charging circuit 151 according to an embodiment may not supply power to the electronic device 190, based on the reception of the second connection information. In this case, in the external power source 110, the power frequency may not affect the second frequency. According to various embodiments, the charging circuit 151 may transmit a second connection signal to the electronic device 190 in a state in which the communication channel is formed with the electronic device 190. In this case, the charging circuit 151 may be in a state (e.g., a power hold mode (PHM)) in which power is not supplied to the electronic device 190.

Referring to operation 737, the charging circuit 151 according to an embodiment may determine whether second error information (e.g., a packet including noise) is received from the electronic device 190. For example, when the second error information is received from the electronic device 190, the charging circuit 151 may execute operation 739. When the second error information is not received from the electronic device 190, the charging circuit 151 may end an operation.

Referring to operation 739, based on the reception of the second error information in the charging circuit 151 according to an embodiment, the second frequency may be changed. In this case, the control circuit 153 may convert the second frequency into another frequency that is included in the frequency band of the electronic device 190. Therefore, the charging circuit 151 may communicate with the electronic device 190 at the converted second frequency.

Figure 7:
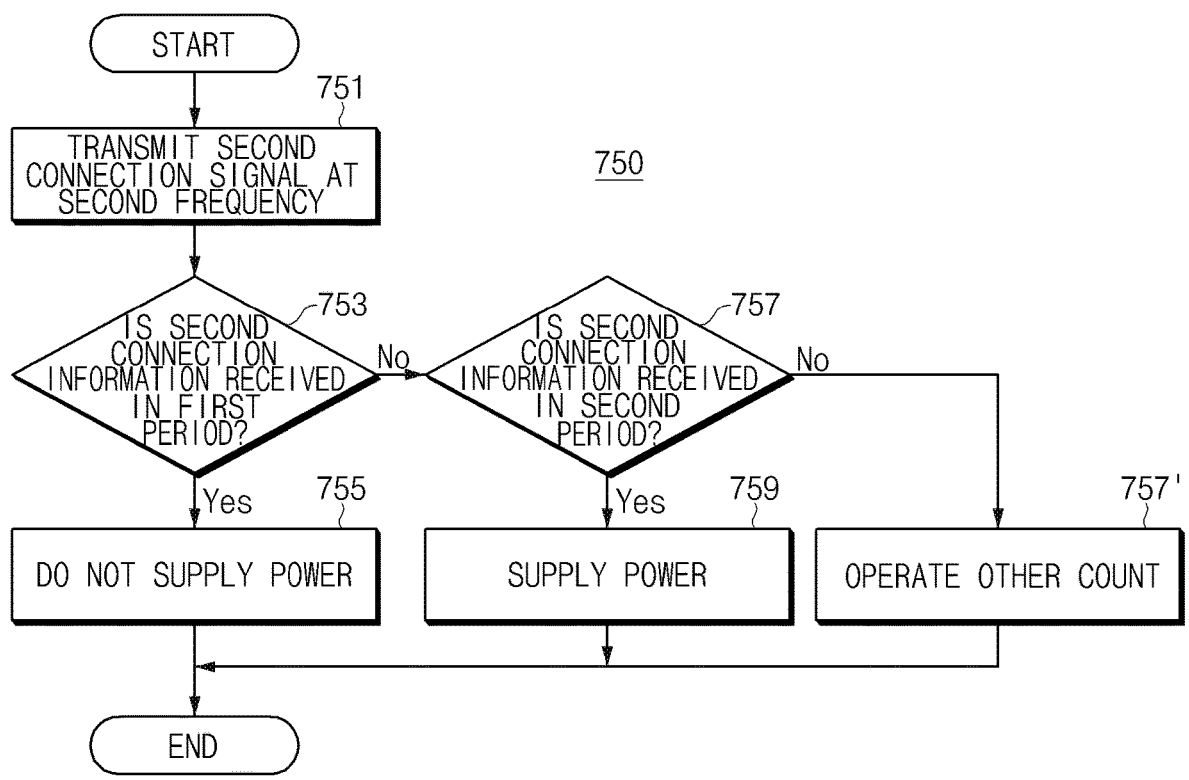
FIG. 7 is a flowchart illustrating a communication method between a wireless charging device and an electronic device, according to an embodiment of the disclosure.

FIG. 7 is a flowchart 750 illustrating a communication method between a wireless charging device and an electronic device, according to an embodiment of the disclosure.

Referring to FIG. 7, a wireless charging device (e.g., the wireless charging device 150 of FIG. 1) according to an embodiment may execute an operation based on a period in which second connection information is received, by communicating with an electronic device (e.g., the electronic device 190 of FIG. 1) at a second frequency.

Referring to operation 751, a charging circuit (e.g., the charging circuit 151 of FIG. 1) according to an embodiment may transmit a second connection signal (e.g., the ping for identifying the charging state of the electronic device 190) to the electronic device 190 at a second frequency that is included in the frequency band of the electronic device 190. For example, when the second connection signal is transmitted by the charging circuit 151, in an external power source (e.g., the external power source 110 of FIG. 1), a power frequency (e.g., a frequency for supplying power) may be converted.

Referring to operation 753, the charging circuit 151 according to an embodiment may determine whether the second connection information (e.g., the packet for notifying the charging state) is received from the electronic device 190 in a first period (e.g., 170 ms). For example, when the second connection information is received from the electronic device 190 in the first period, the charging circuit 151 may execute operation 755. When the second connection information is not received from the electronic device 190 in the first period, the charging circuit 151 may execute operation 757.

Referring to operation 755, the charging circuit 151 according to an embodiment may not supply power to the electronic device 190, based on the reception of the second connection information. In this case, the charging circuit 151 may be in a state (e.g., a power hold mode (PHM)) in which power is not supplied to the electronic device 190. According to various embodiments, the charging circuit 151 may transmit a second connection signal to the electronic device 190 in a state in which the communication channel is formed with the electronic device 190.

Referring to operation 757, the charging circuit 151 according to an embodiment may determine whether the second connection information (e.g., a packet for notifying the charging state) is received from the electronic device 190 in a second period (e.g., a period in which the first period is repeated six times in succession). For example, when the second connection information is received from the electronic device 190 in the second period, the charging circuit 151 may execute operation 759. When it is determined whether the second connection information is received in a period (e.g., the third period) that is different from the second period, the charging circuit 151 may execute another count operation 757' (e.g., operation 777' of FIG. 8).

Referring to operation 759, when the second connection information is received from the electronic device 190 in the second period (e.g., a period in which the first period is repeated six times in succession) after the first period, the charging circuit 151 according to an embodiment may supply the power that is supplied from the external power source 110 to the electronic device 190 under the set condition (e.g., the auxiliary charging condition).

Figure 8:
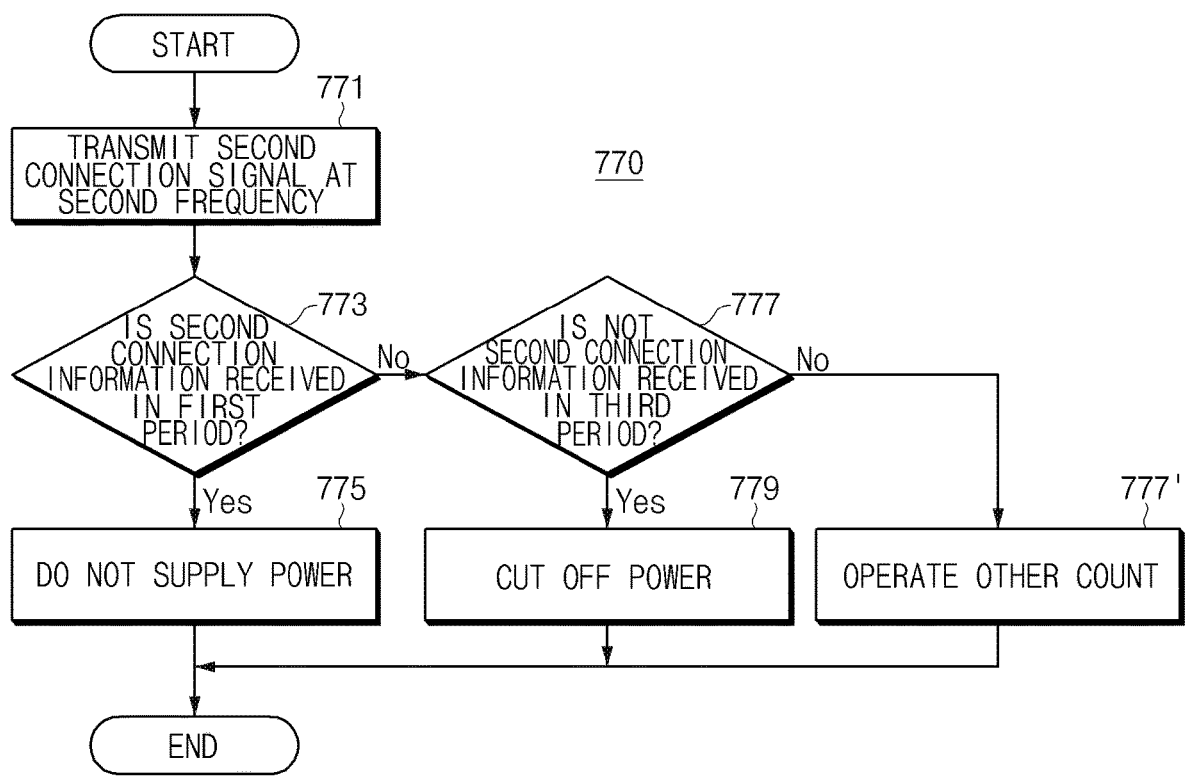
FIG. 8 is a flowchart illustrating a communication method between a wireless charging device and an electronic device, according to an embodiment of the disclosure.

FIG. 8 is a flowchart 770 illustrating a communication method between a wireless charging device and an electronic device, according to an embodiment of the disclosure.

Referring to FIG. 8, a wireless charging device (e.g., the wireless charging device 150 of FIG. 1) according to an embodiment may execute an operation based on a period in which second connection information is received (or not received), by communicating with an electronic device (e.g., the electronic device 190 of FIG. 1) at a second frequency.

Referring to operation 771, a charging circuit (e.g., the charging circuit 151 of FIG. 1) according to an embodiment may transmit a second connection signal (e.g., the ping for identifying the charging state of the electronic device 190) to the electronic device 190 at a second frequency that is included in the frequency band of the electronic device 190. For example, when the second connection signal is transmitted by the charging circuit 151, in an external power source (e.g., the external power source 110 of FIG. 1), a power frequency (e.g., a frequency for supplying power) may be converted.

Referring to operation 773, the charging circuit 151 according to an embodiment may determine whether the second connection information (e.g., the packet for notifying the charging state) is received from the electronic device 190 in a first period (e.g., 170 ms). For example, when the second connection information is received from the electronic device 190 in the first period, the charging circuit 151 may execute operation 775. When the second connection information is not received from the electronic device 190 in the first period, the charging circuit 151 may execute operation 777.

Referring to operation 775, the charging circuit 151 according to an embodiment may not supply power to the electronic device 190, based on the reception of the second connection information. In this case, the charging circuit 151 may be in a state (e.g., a power hold mode (PHM)) in which power is not supplied to the electronic device 190. According to various embodiments, the charging circuit 151 may transmit a second connection signal to the electronic device 190 in a state in which the communication channel is formed with the electronic device 190.

Referring to operation 777, the charging circuit 151 according to an embodiment may determine whether the second connection information (e.g., a packet for notifying the charging state) is not received from the electronic device 190 in a third period (e.g., a period in which the first period is repeated eight times in succession). For example, when the second connection information is not received from the electronic device 190 in the third period, the charging circuit 151 may execute operation 779. When it is determined whether the second connection information is received in a period (e.g., the second period) that is different from the third period, the charging circuit 151 may execute another count operation 777 (e.g., operation 757 of FIG. 7). According to various embodiments, when it is determined whether the second connection information is received in the third period, the charging circuit 151 may execute another count operation 777 (e.g., operation 757 of FIG. 7).

Referring to operation 779, when the second connection information is not received from the electronic device 190 in the third period (e.g., a period in which the first period is repeated eight times in succession) after the first period, the charging circuit 151 according to an embodiment may cut off the power that is supplied from the external power source 110. In this case, the charging circuit 151 may cut off the power as the power of the wireless charging device 150 is switched from ON state to OFF state.

A wireless charging device (e.g., the wireless charging device 150 of FIG. 1) in communication with an electronic device (e.g., the electronic device 190 of FIG. 1), according to various embodiments of the disclosure, includes a charging circuit (e.g., the charging circuit 151 of FIG. 1) that communicates with the electronic device 190 at a first frequency that is included in a frequency band of the electronic device 190, and that supplies power received from an external power source 110 to the electronic device 190 depending on a communication result at the first frequency, and a control circuit (e.g., the control circuit 153 of FIG. 1) that converts the first frequency, based on a response of the electronic device 190 to a first connection signal that is transmitted from the charging circuit 151 to the electronic device 190.

According to various embodiments, when the charging circuit 151 receives first error information from the electronic device 190 as a response to the first connection signal, the control circuit 153 may convert the first frequency.

According to various embodiments, the control circuit 153 may randomly convert the first frequency within the frequency band.

According to various embodiments, the charging circuit 151 may receive first connection information from the electronic device 190 as a response to the first connection signal, by communicating with the electronic device 190 at the first frequency converted.

According to various embodiments, the charging circuit 151 may communicate with the electronic device 190 at a second frequency that is included in the frequency band, and may supply the power under a set condition, based on a communication result at the second frequency.

According to various embodiments, the control circuit 153 may convert the second frequency, based on a response of the electronic device 190 to a second connection signal that is transmitted from the charging circuit 151 to the electronic device 190.

According to various embodiments, when the charging circuit 151 receives second error information from the electronic device 190 as a response to a second connection signal, the control circuit 153 may convert the second frequency.

According to various embodiments, the control circuit 153 may randomly convert the second frequency within the frequency band.

According to various embodiments, the charging circuit 151 may receive second connection information from the electronic device 190 as a response to the second connection signal, by communicating with the electronic device 190 at the second frequency converted.

According to various embodiments, the control circuit 153 may set the first frequency and the second frequency into different frequencies within the frequency band.

According to various embodiments, the charging circuit 151 may transmit a second connection signal to the electronic device in a first period, and when a response to the second connection signal is received from the electronic device 190 in a second period after the first period, may supply the power to the electronic device 190 under an auxiliary charging condition.

According to various embodiments, the charging circuit 151 may transmit a second connection signal to the electronic device 190 in a first period, and when a response to the second connection signal is received from the electronic device 190 in a third period after the first period, may cut off the power that is supplied to the electronic device 190.

A method of communicating of the wireless charging device 150 to communicate with an electronic device 190, according to various embodiments of the disclosure, includes transmitting (e.g., operation 711 of FIG. 5), by a charging circuit 151, a first connection signal to the electronic device 190 at a first frequency that is included in a frequency band of the electronic device 190, supplying (e.g., operations 713 and 715 of FIG. 5), by the charging circuit 151, power received from an external power source 110 to the electronic device 190, based on a communication result at the first frequency, and converting (e.g., operations 717 and 719 of FIG. 5), by a control circuit 153, the first frequency, based on a response of the electronic device 190 to the first connection signal.

According to various embodiments, when the charging circuit 151 receives first error information from the electronic device 190 as a response to the first connection signal, the converting may include converting (operation 719), by the control circuit 153, the first frequency.

According to various embodiments, the converting may include randomly converting (operation 719), by the control circuit 153, the first frequency within the frequency band.

According to various embodiments, the method further includes allowing the charging circuit 151 to communicate with the electronic device 190 at the first frequency converted and to receive (after operation 719) first connection information from the electronic device 190 as a response to the first connection signal.

According to various embodiments, the method further includes allowing the charging circuit 151 to communicate with the electronic device 190 at a second frequency that is included in the frequency band and to supply (e.g., operation 735 of FIG. 6, operations 755 and 759 of FIG. 7, or operations 775 and 779 of FIG. 8) the power under a set condition, based on a communication result at the second frequency.

According to various embodiments, the method further includes allowing the control circuit 153 to convert (e.g., operation 739 of FIG. 6) the second frequency, based on a response of the electronic device 190 to a second connection signal transmitted from the charging circuit 151 to the electronic device 190.

According to various embodiments, the transmitting may include transmitting, by the charging circuit 151, a second connection signal to the electronic device 190 in a first period, and the supplying may include supplying (operation 719), by the charging circuit 151, the power to the electronic device 190 under an auxiliary charging condition when a response to the second connection signal is input to the charging circuit 151 from the electronic device 190 in a second period after the first period.

According to various embodiments, the method further includes allowing the charging circuit 151 to transmit a second connection signal to the electronic device 190 in a first period, and allowing the charging circuit 151 to cut off (operation 719) the power that is supplied to the electronic device when a response to the second connection signal is input from the electronic device 190 in a third period after the first period.

Figure 9:
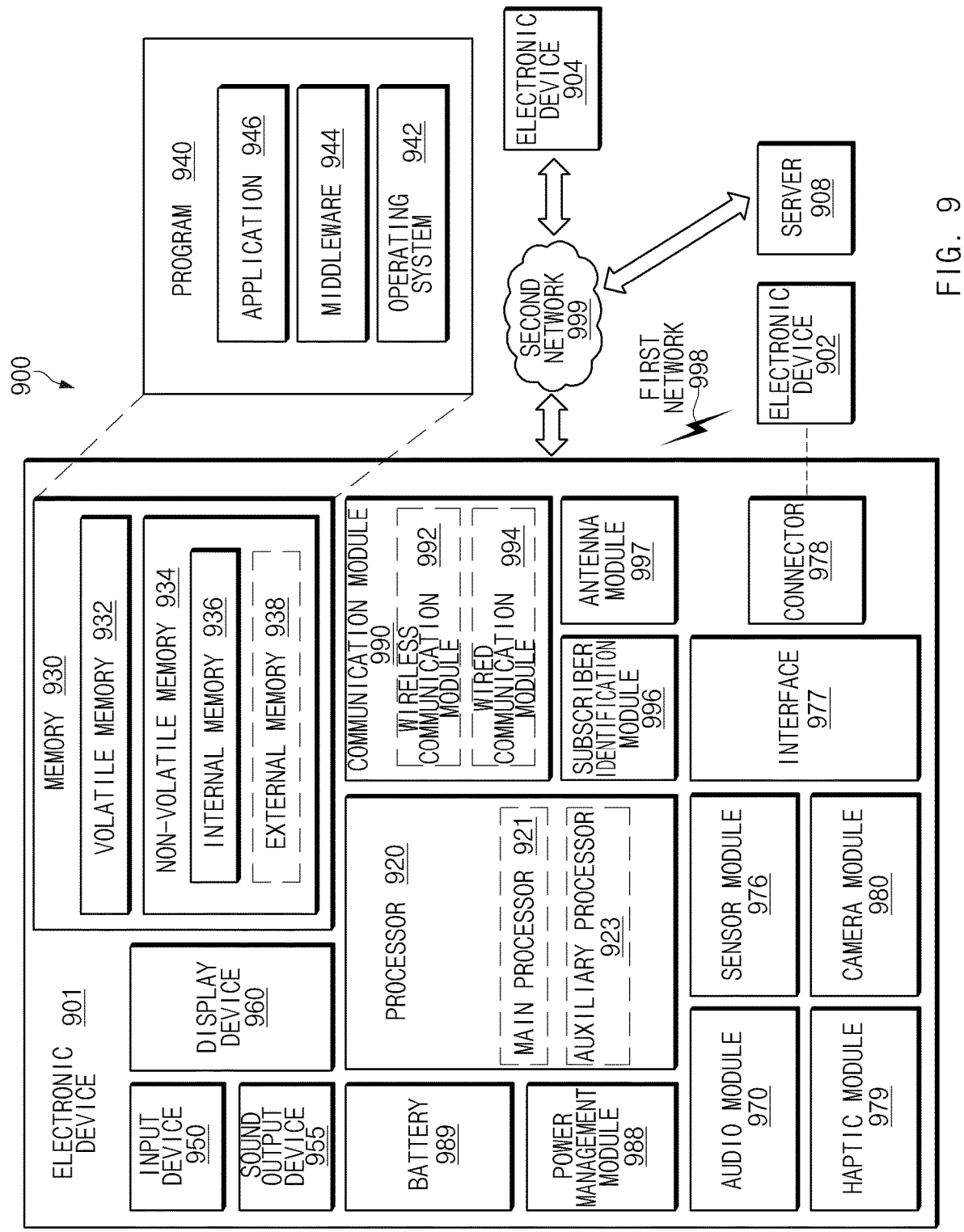
FIG. 9 is a block diagram illustrating an electronic device in a network environment according to an embodiment of the disclosure.

FIG. 9 is a block diagram illustrating an electronic device 901 in a network environment 900 according to an embodiment of the disclosure.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™ wireless-fidelity (Wi-Fi) direct, or infrared data association (IrDA)) or the second network 999

(e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., printed circuit board (PCB)). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, as a frequency of a wireless charging device is converted, the wireless charging device may communicate smoothly with an electronic device.

In addition, according to various embodiments disclosed in the disclosure, as a charging state (e.g., an auxiliary charging or power off) of a battery of an electronic device is set depending on the time (e.g., a succession period) when a response (e.g., a packet) is received from the electronic device to the wireless charging device, overcharging of the electronic device may be prevented.

In addition, various effects may be provided that are identified directly or indirectly through this document.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of communicating of a wireless charging device to communicate with an electronic device, the method comprising:
    transmitting, by a charging circuit, a first connection signal, including a ping for identifying the connection of the electronic device to the electronic device at a first frequency that is included in a frequency band of the electronic device;
    supplying, by the charging circuit, power received from an external power source to the electronic device, based on a communication result at the first frequency; and
    converting, by a control circuit, the first frequency, when first error information is input to the charging circuit from the electronic device as response to the first connection signal;
    communicating with the electronic device at the first frequency converted; and
    receiving first connection information from the electronic device as a response to the first connection signal, wherein the first connection information includes a packet for establishing a communication channel.

2. The method of claim 1, wherein the converting of the first frequency includes randomly converting, by the control circuit, the first frequency within the frequency band.

* * * * *